(12) United States Patent
Hsu

(10) Patent No.: US 8,398,104 B2
(45) Date of Patent: Mar. 19, 2013

(54) BICYCLE SEAT ADJUSTABLE DEVICE

(76) Inventor: Jung Yu Hsu, Tainan (TW)

( * ) Notice: Subject to any disclaimer, the term of this patent is extended or adjusted under 35 U.S.C. 154(b) by 259 days.

(21) Appl. No.: 12/914,566

(22) Filed: Oct. 28, 2010

(65) Prior Publication Data

US 2012/0104727 A1   May 3, 2012

(51) Int. Cl.
 *B62J 1/06* (2006.01)
(52) U.S. Cl. .............. 280/220; 267/64.26; 267/117; 267/132; 280/278; 297/215.13
(58) Field of Classification Search .......... 280/220, 280/275, 278, 283, 287; 248/161; 267/64.26, 267/117, 132; 297/215.13, 199, 200, 344.19
See application file for complete search history.

(56) References Cited

U.S. PATENT DOCUMENTS

| | | | | |
|---|---|---|---|---|
| 4,915,364 A | * | 4/1990 | Perlini | 267/64.26 |
| 5,115,723 A | * | 5/1992 | Wang | 92/5 R |
| 5,826,935 A | * | 10/1998 | DeFreitas | 297/215.13 |
| 6,135,434 A | * | 10/2000 | Marking | 267/64.26 |
| 6,938,887 B2 | * | 9/2005 | Achenbach | 267/64.22 |
| 8,191,964 B2 | * | 6/2012 | Hsu | 297/215.13 |
| 2004/0070168 A1 | * | 4/2004 | McKinnon | 280/281.1 |
| 2006/0066074 A1 | * | 3/2006 | Turner | 280/287 |
| 2009/0324327 A1 | * | 12/2009 | McAndrews et al. | 403/409.1 |
| 2010/0187055 A1 | * | 7/2010 | Becker et al. | 188/275 |
| 2011/0257848 A1 | * | 10/2011 | Shirai | 701/49 |

* cited by examiner

*Primary Examiner* — Anne Marie M Boehler
(74) *Attorney, Agent, or Firm* — Rosenberg, Klein & Lee

(57) ABSTRACT

A bicycle seat adjustable device includes an outer tube with an inner tube movably inserted therein and a piston is connected to the inner tube. A valve control device includes an outer path tube in the inner tube, and a lower end of the outer path tube is connected to the piston and a top end of the outer path tube extends toward the inner tube. A movable piston is movably mounted to the outer path tube. An outer oil room and an inner air room are defined between the inner tube and the outer path tube. A valve unit is connected to the inner path tube to form an inner oil room and a path which communicates with the outer oil room and the inner oil room, and controlled by the valve unit. The inner tube and the inner path tube increases the travel distance of the hydraulic oil.

11 Claims, 15 Drawing Sheets

BICYCLE SEAT ADJUSTABLE DEVICE

FIELD OF THE INVENTION

The present invention relates to a seat adjustable device, and more particularly, to a seat adjustable device using oil and air to adjust the height of the bicycle seat.

BACKGROUND OF THE INVENTION

The proper height of the bicycle seat for the cyclist is when one of the legs of the cyclist is straight while the pedal is located at the lowest position. The correct height of the bicycle seat is important to let the cyclist operate the bicycle comfortably.

It requires a significant cost to have a custom-made bicycle frame because of the different sizes of the cyclists so that the bicycle seat adjustable device is needed to adjust the height of the seat according individual needs of the cyclist.

The conventional seat adjustable devices generally include mechanical adjustable devices, hydraulic adjustable devices, and hybrid adjustable devices which use air and hydraulic liquid. The mechanical adjustable devices use mechanical parts to set the relative height between the seat and the seat tube. The hydraulic adjustable devices use hydraulic liquid such as oil or air cooperated with paths to achieve the purpose of adjustment of the seat. The hybrid adjustable devices utilize both air and hydraulic liquid to adjust the height of the seat relative to the seat tube.

The air is compressible and the hydraulic oil movable in the paths in the adjustable device so as to allow the seat post and seat tube to have relative and linear movement to position the proper height of the seat.

One of the hydraulic seat adjustable devices is disclosed in Taiwan Utility Patent Application No. 089221346 and comprises a locking part to which a lever and a guide rod are respectively connected. The guide rod includes a passage and a movable rod is movably located in the passage. The movable rod has one end extending out from the central hole in the locking part and contacting against an end of the lever. A spring is mounted to the movable rod and located between the lever and the locking part. A hollow tube is mounted to the guide rod and a pressure tube is located in the hollow tube. A piston is located in the pressure tube, a front action rod and a rear action rod are located in the piston. The front and rear action rods are cooperated with the pressure rings and control holes to control the movement of the guide rod. A head frame is mounted to the hollow tube and the threaded rod is threadedly connected to the two side threaded holes in the head frame. Two adjustable blocks are forcibly inserted into the hollow tube and an engaging block is engaged with the hole of the hollow tube.

Because the pressure tube is located in the hollow tube, and the front and rear action rods in the pressure rod are cooperated with multiple pressure rings to urge the guide rod or to move the guide rod, the user can adjust the seat directly by pulling the lever. However, the device lacks detailed description of the positions where the air or oil fills, the patterns of action of the oil or air are not disclosed.

Another one of the hydraulic seat adjustable devices is disclosed in Taiwan Utility Patent Application No. 097206782 and comprises a seat tube in which a seat post is linearly and movably inserted. A seat is connected to the top of the seat post. An adjustable device is located in the seat post and includes a base tube which is fixed to the seat tube and includes a top opening. An adjustable tube is located in the base tube. An adjustable frame is located beneath the adjustable tube and is co-movable with the adjustable tube. The adjustable tube defines an upper space and a bottom space in the base tube. A path is defined between the adjustable tube and the adjustable frame so as to communicate the upper and bottom spaces. A valve rod movably extends through the adjustable tube so as to open or close the passage, by this arrangement, the seat tube and the base tube have relative movement to adjust the position of the seat.

However, the hydraulic oil has to move between the two spaces to keep the pressure balance in the spaces, when the hydraulic oil flows fast within a short time between two different pressures, the pressure in one of the spaces may become too low to delay the movement of the adjustment of the seat.

The present invention intends to provide a bicycle seat adjustable device which does not change the sizes of the seat tube and seat post, and the hydraulic oil and air can be utilized to smoothly adjust the height of the seat.

SUMMARY OF THE INVENTION

The present invention relates to a bicycle seat adjustable device and comprises an outer tube with an inner tube movably inserted therein and a piston is connected to the inner tube. The piston is located in the outer tube so as to define an outer air room in the outer tube. A valve control device includes an outer path tube in the inner tube, and a lower end of the outer path tube is connected to the piston and a top end of the outer path tube extends toward the inner tube. A movable piston is movably mounted to the outer path tube. An outer oil room and an inner air room are defined between the inner tube and the outer path tube. A valve unit is connected to the inner path tube to form an inner oil room and a path which communicates with the outer oil room and the inner oil room, and controlled by the valve unit. By the arrangement of the inner tube and the inner path tube, the travel distance of the hydraulic oil is increased which prevents the lower pressure problem in any oil room and makes the hydraulic oil flow smoothly. The delay of adjustment and the impact between parts can be avoided.

The primary object of the present invention is to provide a bicycle seat adjustable device which includes two inner tubes to increase the travel distance of the hydraulic oil so as to prevent the lower pressure problem in any oil room, and makes the hydraulic oil flow smoothly. The delay of adjustment and the impact between parts can be avoided.

Another object of the present invention is to provide a bicycle seat adjustable device which can also be used with mechanical adjustable device and hybrid adjustable device.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
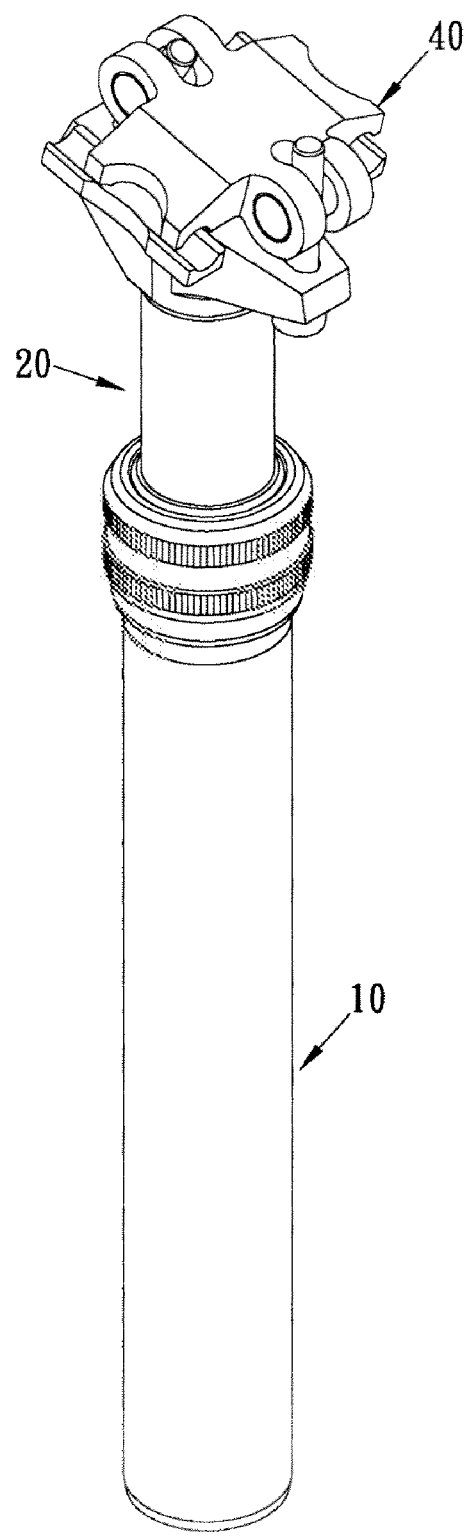
FIG. 1 is a perspective view to show the bicycle seat adjustable device of the present invention.
Figure 2:
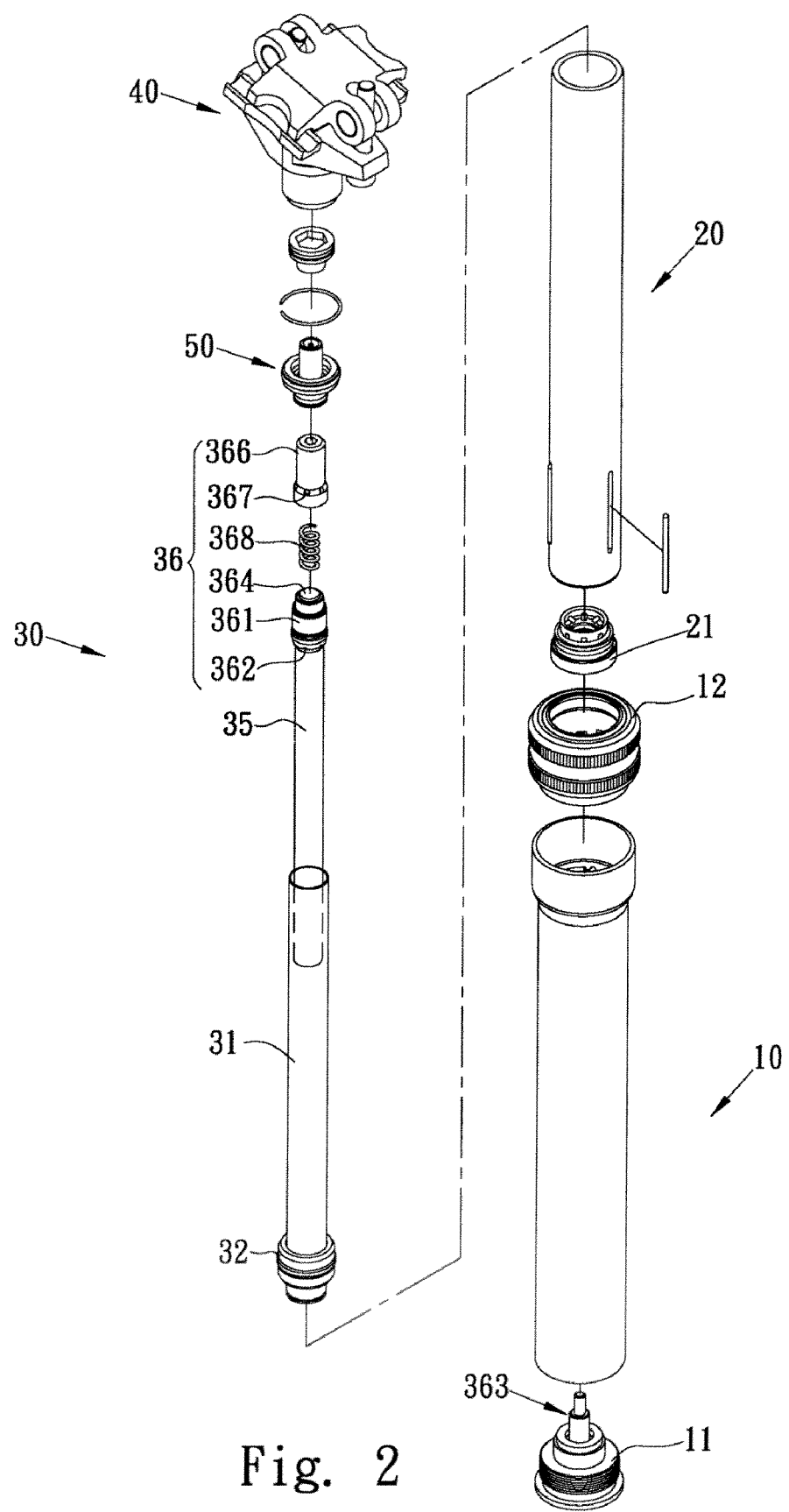
FIG. 2 is an exploded view to show the bicycle seat adjustable device of the present invention.
Figure 3:
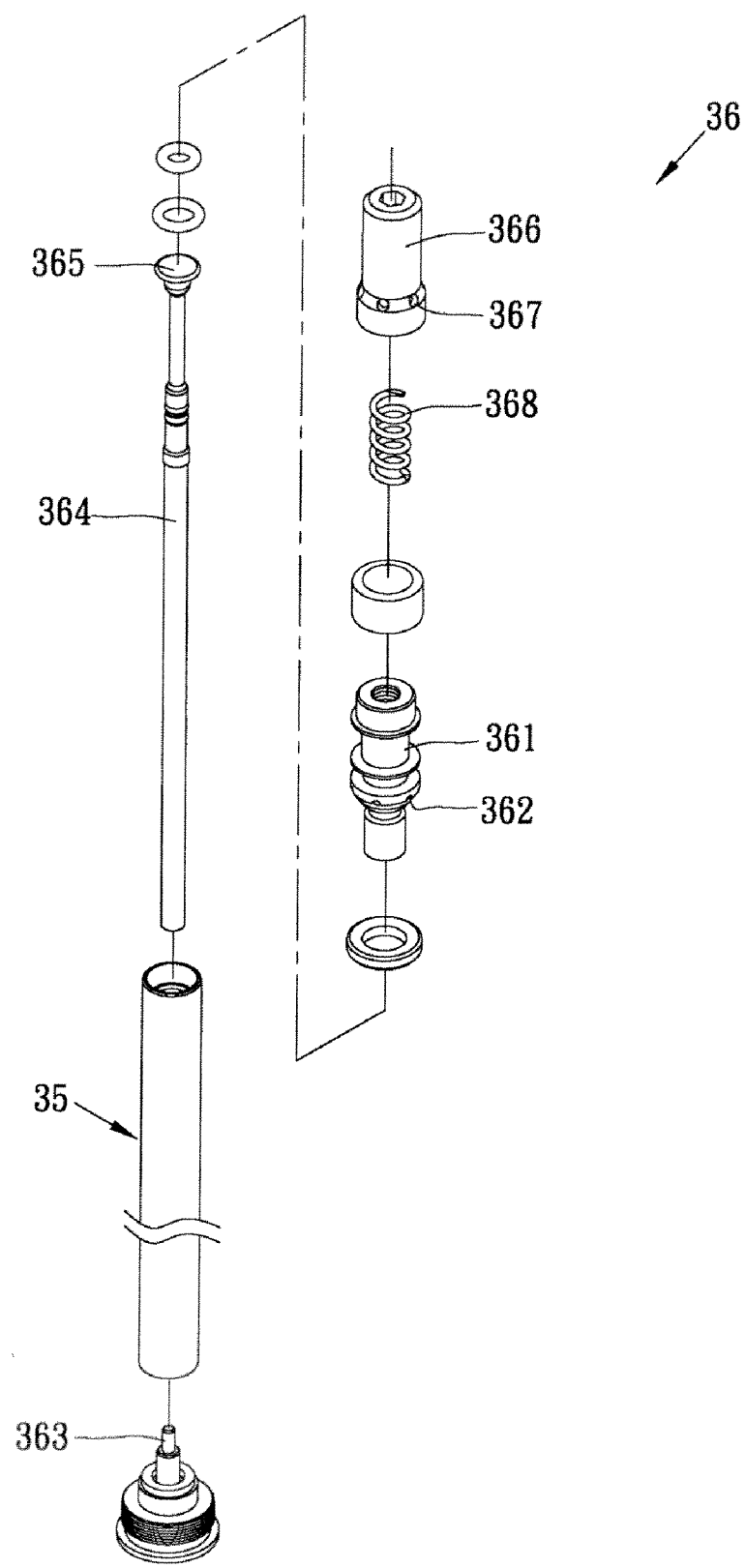
FIG. 3 is an exploded view to show valve unit of the bicycle seat adjustable device of the present invention.
Figure 4:
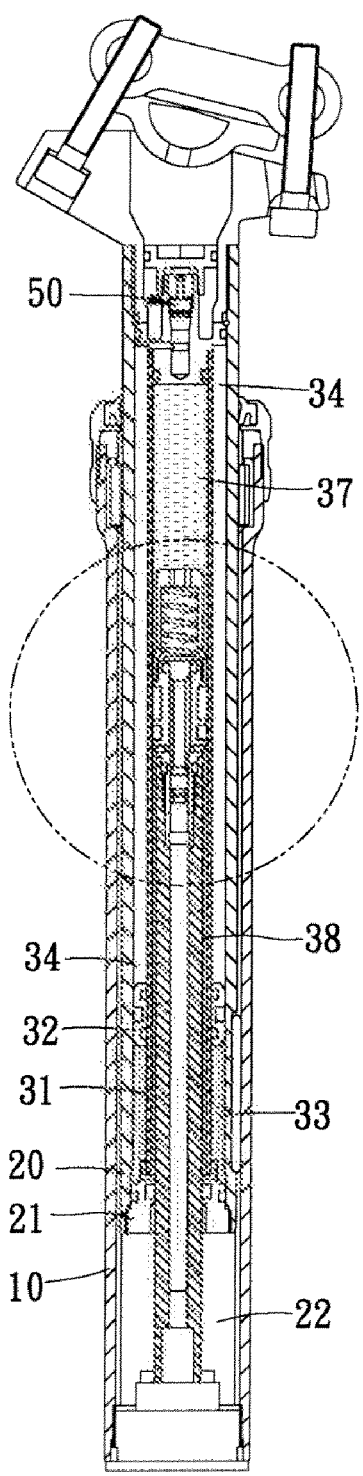
FIG. 4 is a cross sectional view of the bicycle seat adjustable device of the present invention.
Figure 5:
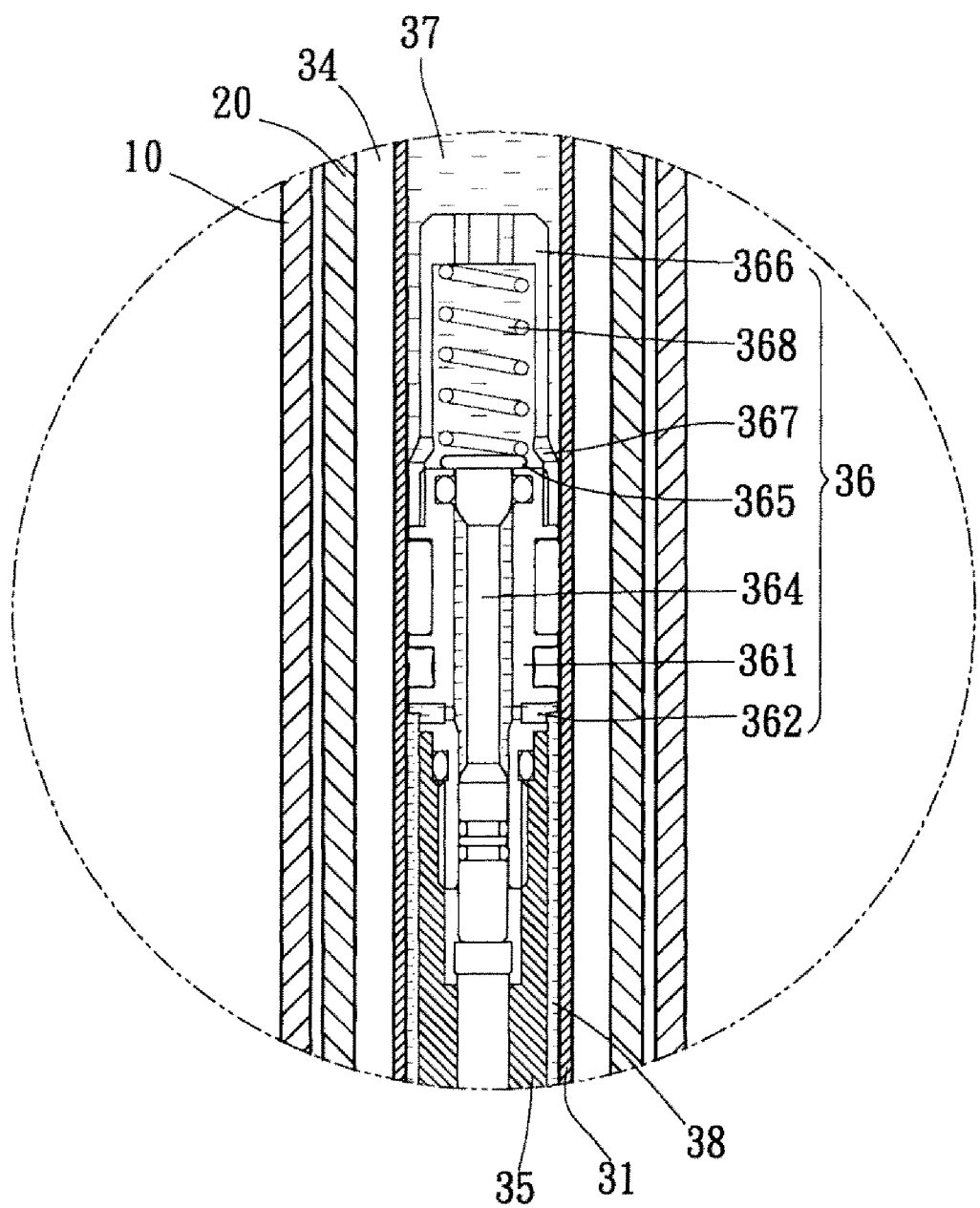
FIG. 5 is an enlarged cross sectional view of the circled portion in FIG. 4.
Figure 6:
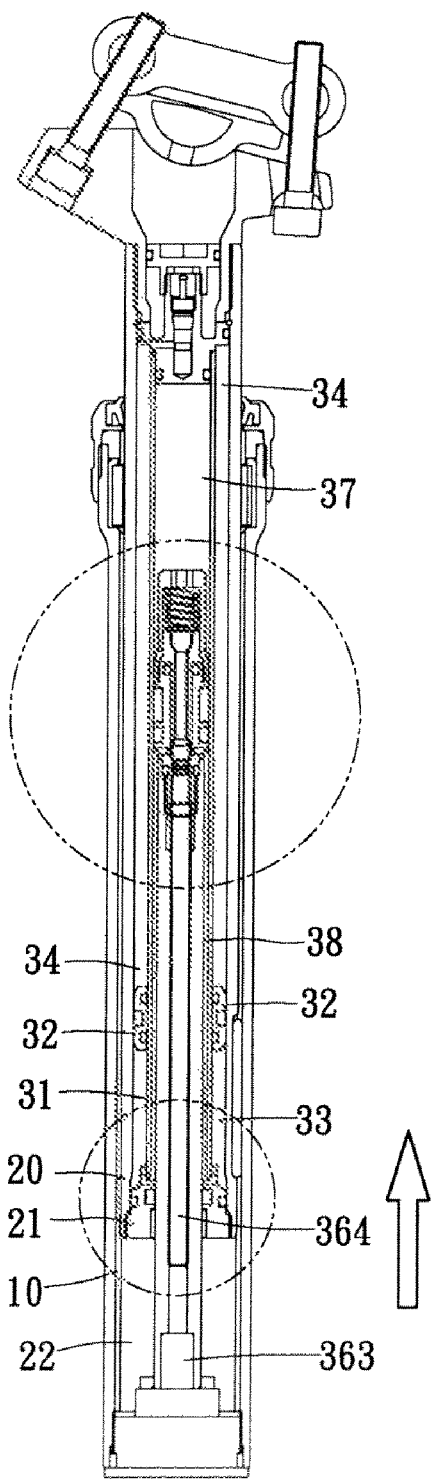
FIG. 6 is a cross sectional view of the bicycle seat adjustable device of the present invention, wherein the seat is adjusted upward.
Figure 7:
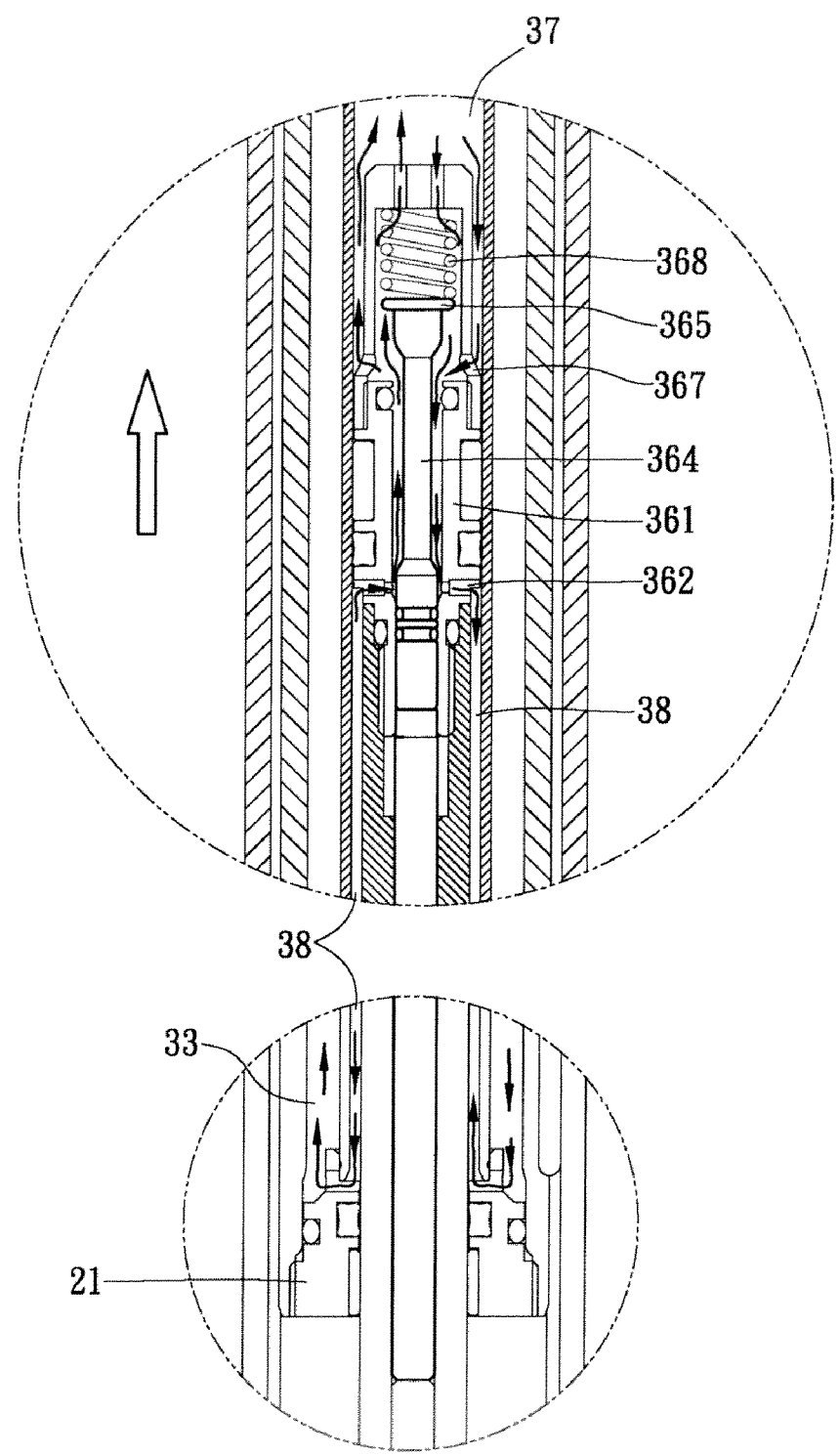
FIG. 7 shows two enlarged cross sectional views of the two circled portions in FIG. 6.
Figure 8:
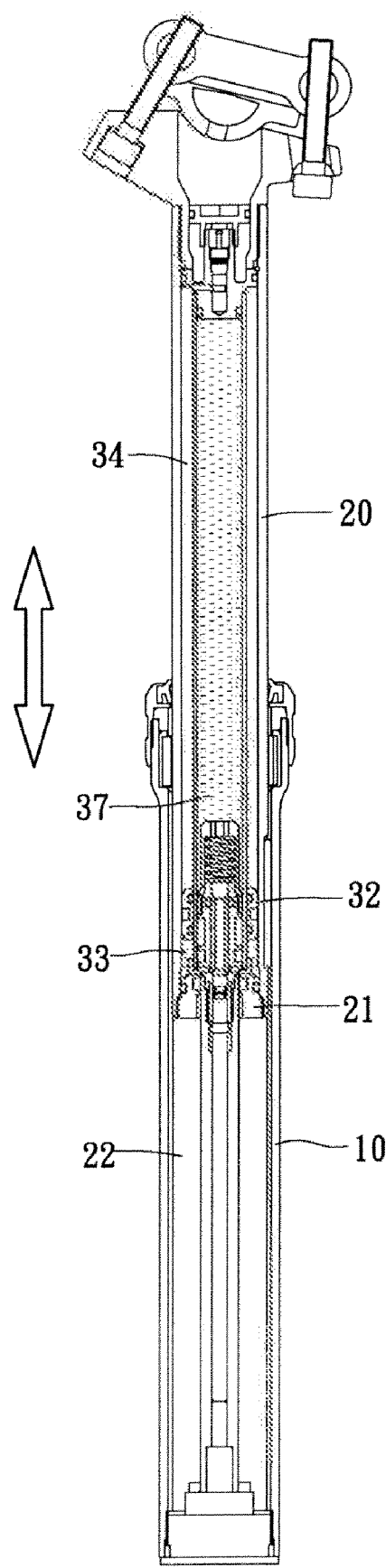
FIG. 8 shows the adjustment of the seat by the bicycle seat adjustable device of the present invention.
Figure 9:
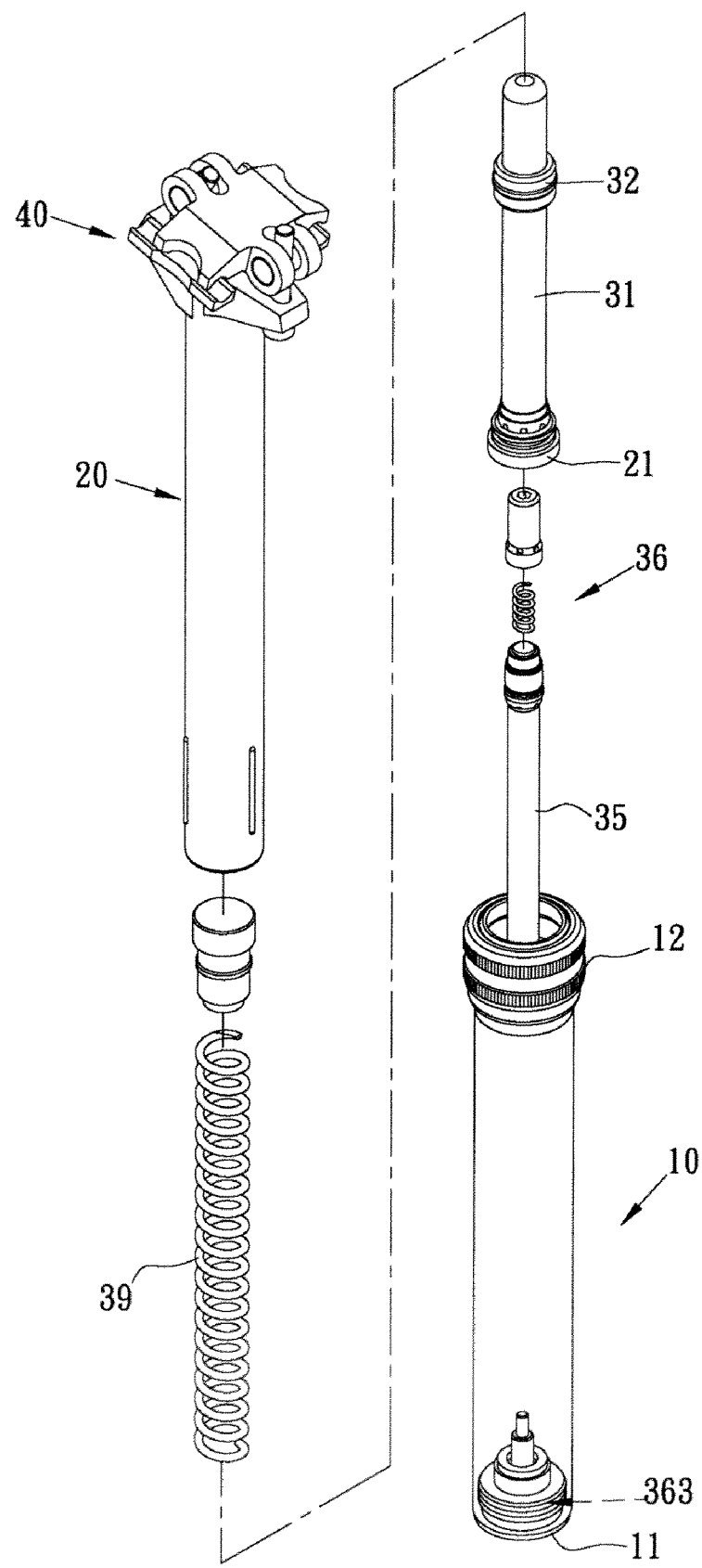
FIG. 9 is an exploded view to show the second embodiment of the bicycle seat adjustable device of the present invention.
Figure 10:
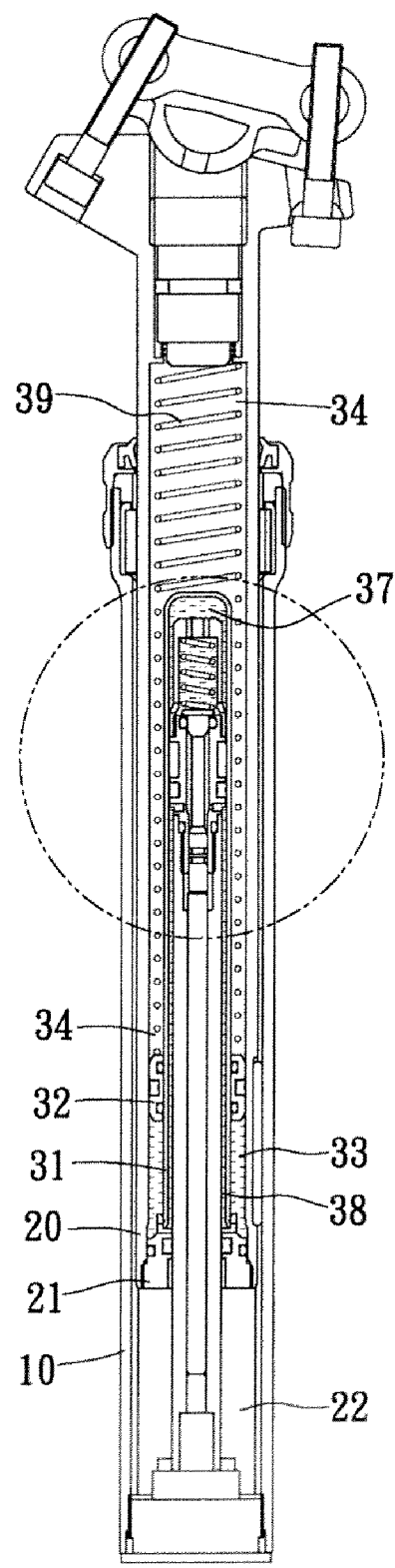
FIG. 10 is a cross sectional view of the second embodiment of the bicycle seat adjustable device of the present invention.
Figure 11:
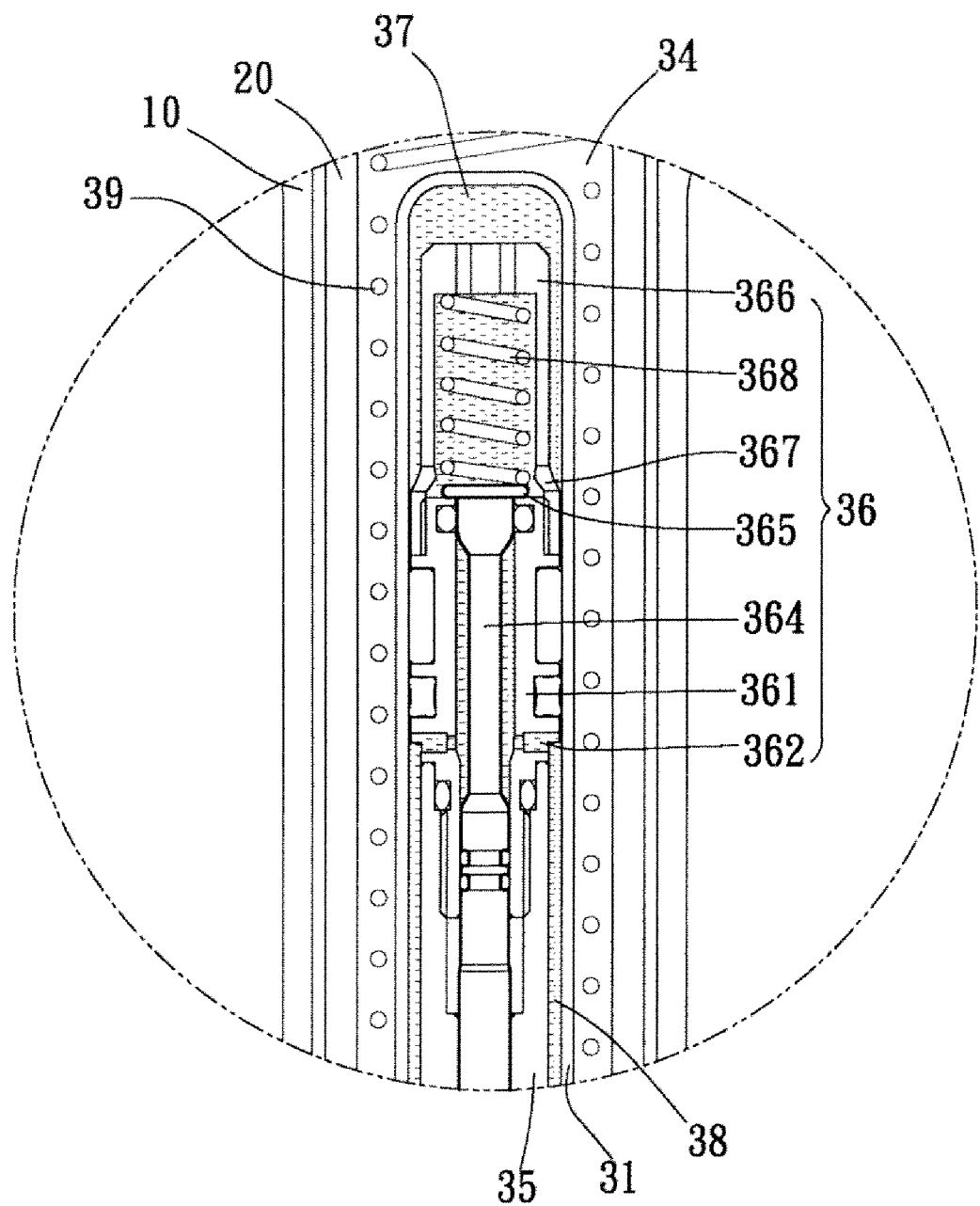
FIG. 11 is an enlarged cross sectional view of the circled portion in FIG. 10.
Figure 12:
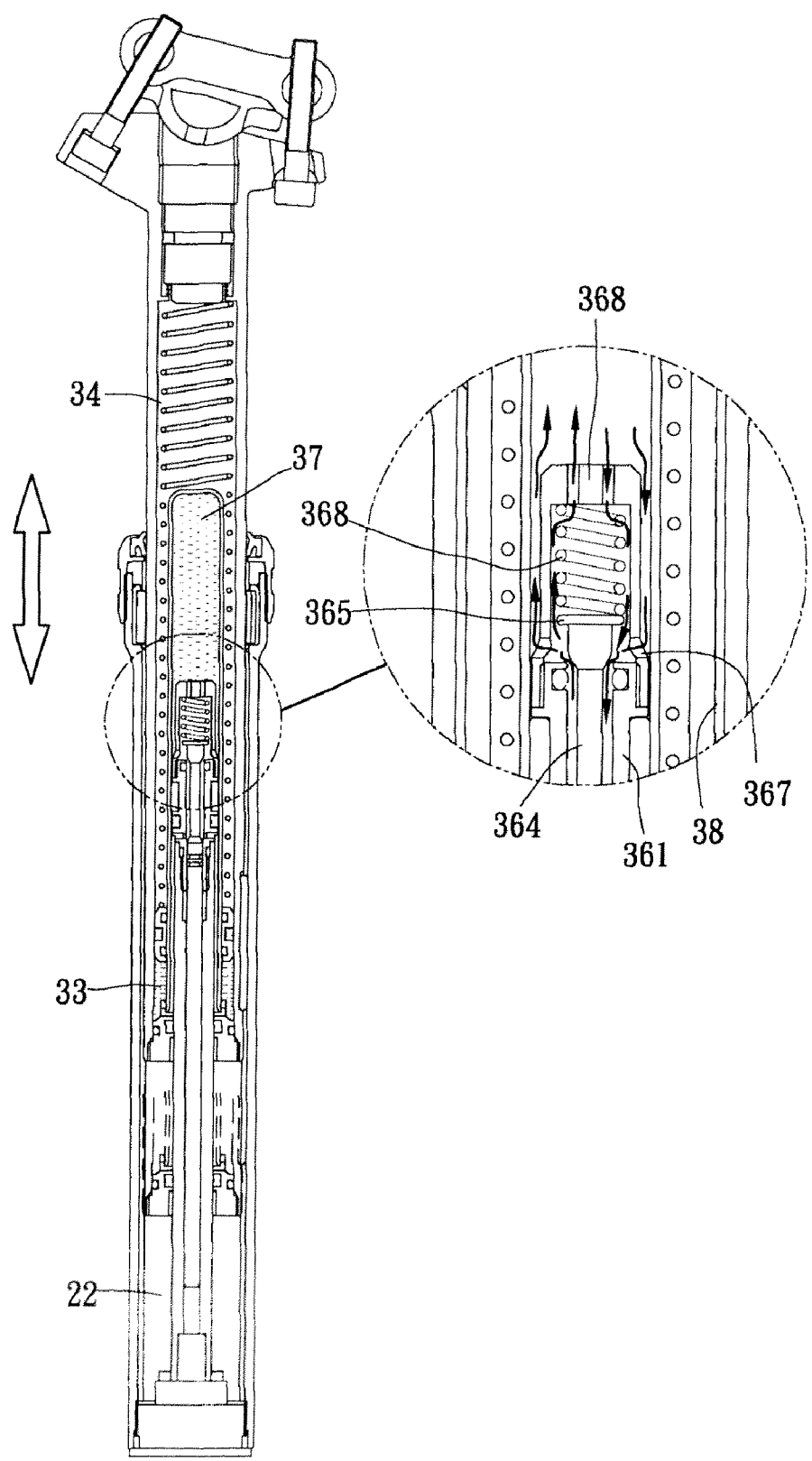
FIG. 12 is a cross sectional view of the second embodiment of the bicycle seat adjustable device of the present invention, wherein the seat is adjusted up and down.

Referring to FIGS. 1 to 5, the bicycle seat adjustable device of the present invention comprises an outer tube 10 and an inner tube 20, and a valve control device 30 is located in the inner tube 20. A clamp unit 40 is connected to the top end of the inner tube 20 and a nozzle unit 50 is located between the clamp unit 40 and the inner tube 20.

The outer tube 10 is a hollow tube and a bottom cap 11 seals the lower end of the outer tube 10. A top cap 12 is connected to the top end of the outer tube 10 and seals the periphery of the outer tube 10. The inner tube 20 extends through the top cap 12.

The inner tube 20 is a hollow tube and a piston 21 seals the lower end of the inner tube 20. The piston 21 is located in the outer tube and an outer air room 22 is defined in the outer tube 10 and located between the piston 21 and the bottom cap 11.

The valve control device 30 comprises an outer path tube 31 located in the inner tube 20. The lower end of the outer path tube 31 is connected to the piston 21 and the top end of the outer path tube 31 extends toward the clamp unit 40. A movable piston 32 is movably mounted to the outer path tube 31, and an outer oil room 33 and an inner air room 34 are defined between the inner tube 20 and the outer path tube 31. The bottom cap 11 is connected to an inner path tube 35 which has the top end extending into the outer path tube 31. A valve unit 36 is connected to the upper end of the inner path tube 35 so as to form a path 38 and an inner oil room 37 in the outer path tube 31. The path 38 communicates with the outer oil room 33 and the inner oil room 37. The valve unit 36 controls the communication of the path 38. The outer oil room 33 and the inner oil room 37 are filled with hydraulic oil which flows between the outer oil room 33 and the inner oil room 37 via the path 38 controlled by the valve unit 36.

The valve unit 36 includes a valve frame 361 which is connected to the inner path tube 35 and includes a passage 362 which communicates with the inner oil room 37 and the path 38. A control unit 363 is located between the bottom cap 11 and the inner path tube 35 so as to provide linear movement. A valve rod 364 has a first end connected with the control unit 363 and a second end of the valve rod 364 extends through the inner path tube 35 and the valve frame 361. The valve rod 364 opens and closes the passage 362 by the linear movement of the control unit 363. The valve rod 364 has a stop 365 which seals the passage 362 by the linear movement of the valve rod 364. The valve frame 361 includes a shell-like sleeve 366 connected to the top end thereof and a through hole 367 is defined through the sleeve 366. The valve rod 364 linearly extends into the sleeve 366. A spring 368 is located between the sleeve 366 and the valve rod 364 to provide a force to the valve rod 364.

The clamp unit 40 is connected to the top end of the inner tube 20 so as to clamp a bicycle seat (not shown). The clamp unit 40 is located in opposite to the piston 21.

The nozzle unit 50 is connected between the clamp unit 40 and the inner tube 20. The nozzle unit 50 has a first end connected to the outer path tube 31 so as to seal the inner oil room 37, a second end of the nozzle unit 50 is inserted into the clamp unit 40 and communicates with the inner air room 34. Via the nozzle unit 50, air is introduced into the inner air room 34 to adjust the pressure in the inner air room 34.

The piston 21 is connected to the inner tube 20 and extends into the outer tube 10 and the outer air room 22 is defined between the bottom cap 11, the inside of the outer tube 10 and the piston 21. The outer air room 22 is filled with pressurized air with pre-set pressure.

The movable piston 32 is mounted to the outer path tube 31 and inserted into the inner tube 20 to define two rooms, wherein the outer oil room 33 is defined between the piston 21, the inside of the inner tube 20, the outside of the outer path tube 31 and the movable piston 32. The inner air room 34 is defined between the nozzle unit 50, the inside of the inner tube 20, the outside of the outer path tube 31 and the movable piston 32. The outer oil room 33 is filled with hydraulic oil and the inner air room 34 is filled with pressurized air.

The valve unit 36 is inserted into the outer path tube 31 and defines the interior of the outer path tube 31 into a room and a path. The inner oil room 37 is defined between the valve frame 361, the inside of the outer path tube 31 and the nozzle unit 50. Hydraulic oil is filled in the inner oil room 37. The path 38 is defined between the valve frame 361, the inside of the outer path tube 31, the outside of the inner path tube 35 and the piston 21.

The valve frame 361 includes a shell-like sleeve 366 connected to the top end thereof and a through hole 367 is defined through the sleeve 366. The valve rod 364 linearly extends into the sleeve 366. A spring 368 is located in the sleeve 366 and two ends of the spring 368 contact between the valve frame 361 and the valve rod 364 so as to provide a force to the valve rod 364.

The path 38 extends from the inner oil room 37 to the sleeve 366 via the through hole 367. When the stop 365 of the valve rod 364 is opened, the hydraulic oil flows into the valve frame 361 and enters the path 38 via the passage 362, and finally flows into the outer oil room 33. In other words, the hydraulic oil can flows from the inner oil room 37 to the outer oil room 33, or from the outer oil room 33 back to the inner oil room 37.

When adjusting the height of the seat, the control unit 363 moves the valve rod 364 linearly to the sleeve 366, the stop 365 is removed from the valve frame 361 so that the path 38 is opened. the hydraulic oil flows from the inner oil room 37 to the outer oil room 33, or from the outer oil room 33 back to the inner oil room 37. The inner tube 20 is linearly moved relative to the outer tube 10 to adjust the height of the seat.

When the seat is adjusted to be lowered, the inner tube 20 is moved into the outer tube 10 to reduce the volume of the outer air room 22, and the volume of the inner oil room 37 is reduced because the valve unit 36 occupies space. The hydraulic oil flows from the inner oil room 37 to the outer oil room 33 via the path 38 and the valve unit 36. The pressure of the outer oil room 33 is increased to move the movable piston 32 toward the inner air room 34.

When the seat is adjusted to be higher, the inner tube 20 is moved in the direction away from the outer tube 10 to increase the volume of the outer air room 22, and the volume of the inner oil room 37 is increased because the valve unit 36 moves away. The pressure of the inner oil room 37 is reduced and the hydraulic oil flows from the outer oil room 33 to the inner oil room 37 via the path 38 and the valve unit 36. The pressure of the outer oil room 33 is reduced to move the movable piston 32 toward the outer air room 22.

When the desired height of the seat is reached, the valve rod 364 is linearly moved away from the sleeve 366 by operation of the control unit 363, the stop 365 contacts the periphery of the valve frame 361 to seal the path 38. A pressure balance is reached between the inner and outer oil rooms 37, 33, and between the inner and outer air rooms 34, 22. The inner tube 20 is set relative to the outer tube 10.

The present invention includes two inner tubes, wherein the outer path tube 31 is located in the inner tube 20 and has the valve unit 36 located therein so as to define the inner oil room 37. This arrangement is able to open or close the path and to increase the travel distance of the hydraulic oil from the inner and outer oil rooms 37, 33 to the path 38. The inner oil room 37 and the path 38 in the outer path tube 31 is long and narrow so that the hydraulic oil flows slower which avoids generating lower pressure in the path or oil rooms 37, 33 so that the adjustment of the inner tube 20 is not delayed.

The longer travel distance and the two inner tubes as mentioned above means that the outer path tube 31 is located in the inner tube 20 and the valve frame 361 is located in the outer path tube 31 to form the inner oil room 37. By this arrangement, the hydraulic oil does not shake due to fast flow speed and impact between parts can be avoided.

The movable piston 32 can automatically adjust the pressure between the outer oil room 34 and the inner air room 34, and also reduce the impact of the hydraulic oil or air when there is a pressure difference.

The spring 368 of the valve unit 36 is designed to provide a force to return the valve rod 364 back to the position where the stop 365 contacts the periphery of the valve frame 361 to seal the path 38 when the control unit 363 releases the force to the valve rod 364 after the valve rod 364 is moved toward the sleeve 366.

FIGS. 9 to 12 show the second embodiment of the present invention, wherein the end of the outer path tube 31 that is opposite the piston 21 is integrally closed and the valve control device 30 includes a spring 39 located in the inner air room 34, one end of the spring 39 contacts the movable piston 32 to provide a force to allow the movable piston 32 to move linearly, so that the inner air room 34 and the outer oil room 33 on two sides of the movable piston 32 reaches pressure balance.

The spring 39 replaces the pre-set air pressure in the inner air room 34 and therefore the nozzle unit 50 can be omitted. It would be not necessary to increase the pressure to the inner air room 34.

Furthermore, the outer path tube 31 can have an integral closed end to ensure no leakage from the inner oil room 37.

Figure 13:
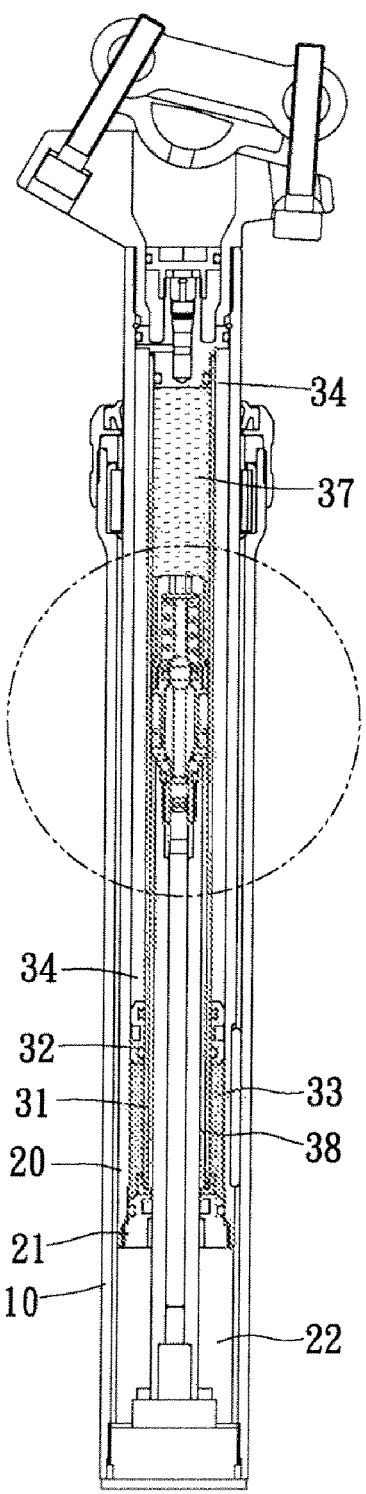
FIG. 13 is a cross sectional view of the third embodiment of the bicycle seat adjustable device of the present invention.
Figure 14:
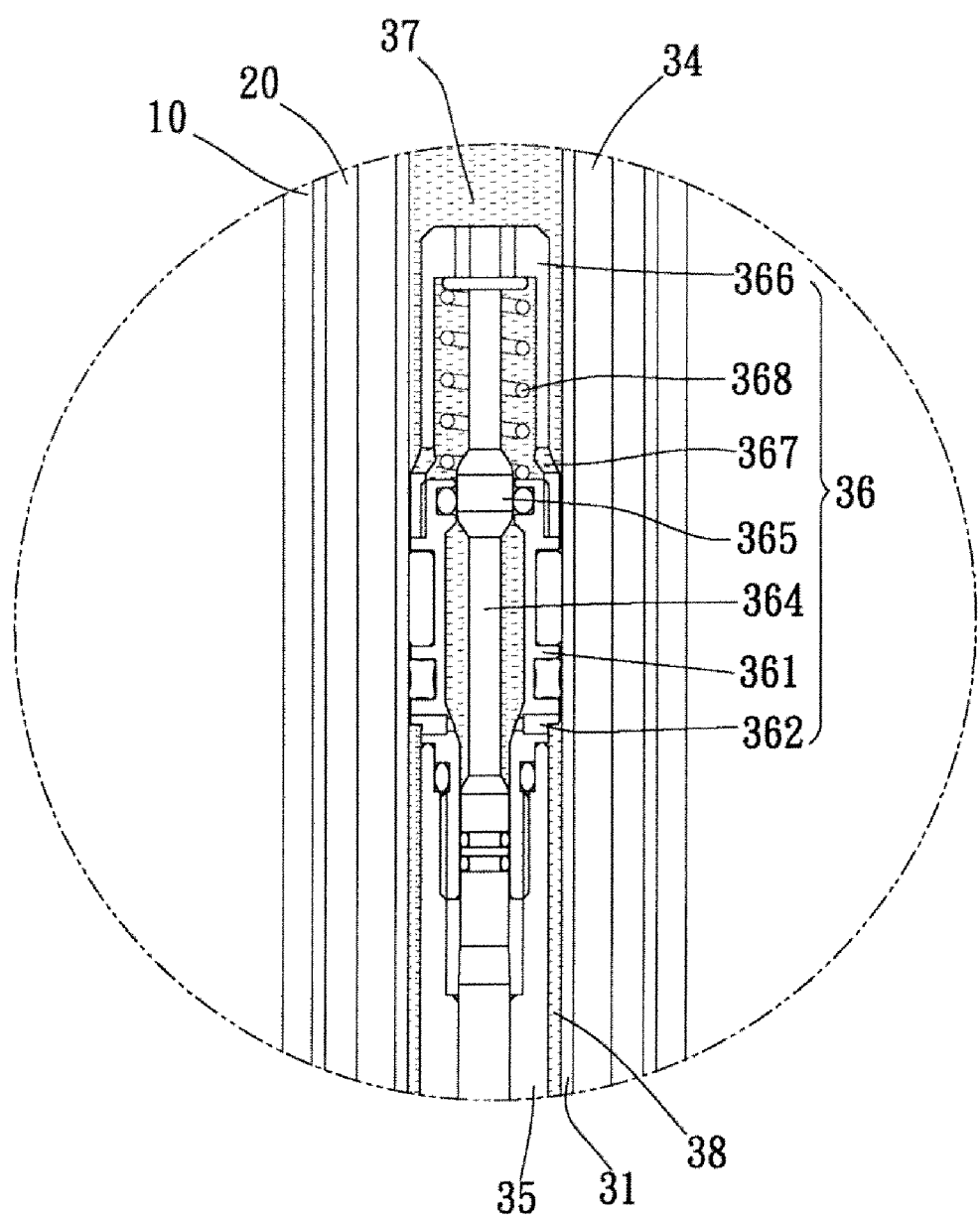
FIG. 14 is an enlarged cross sectional view of the circled portion in FIG. 13.
Figure 15:
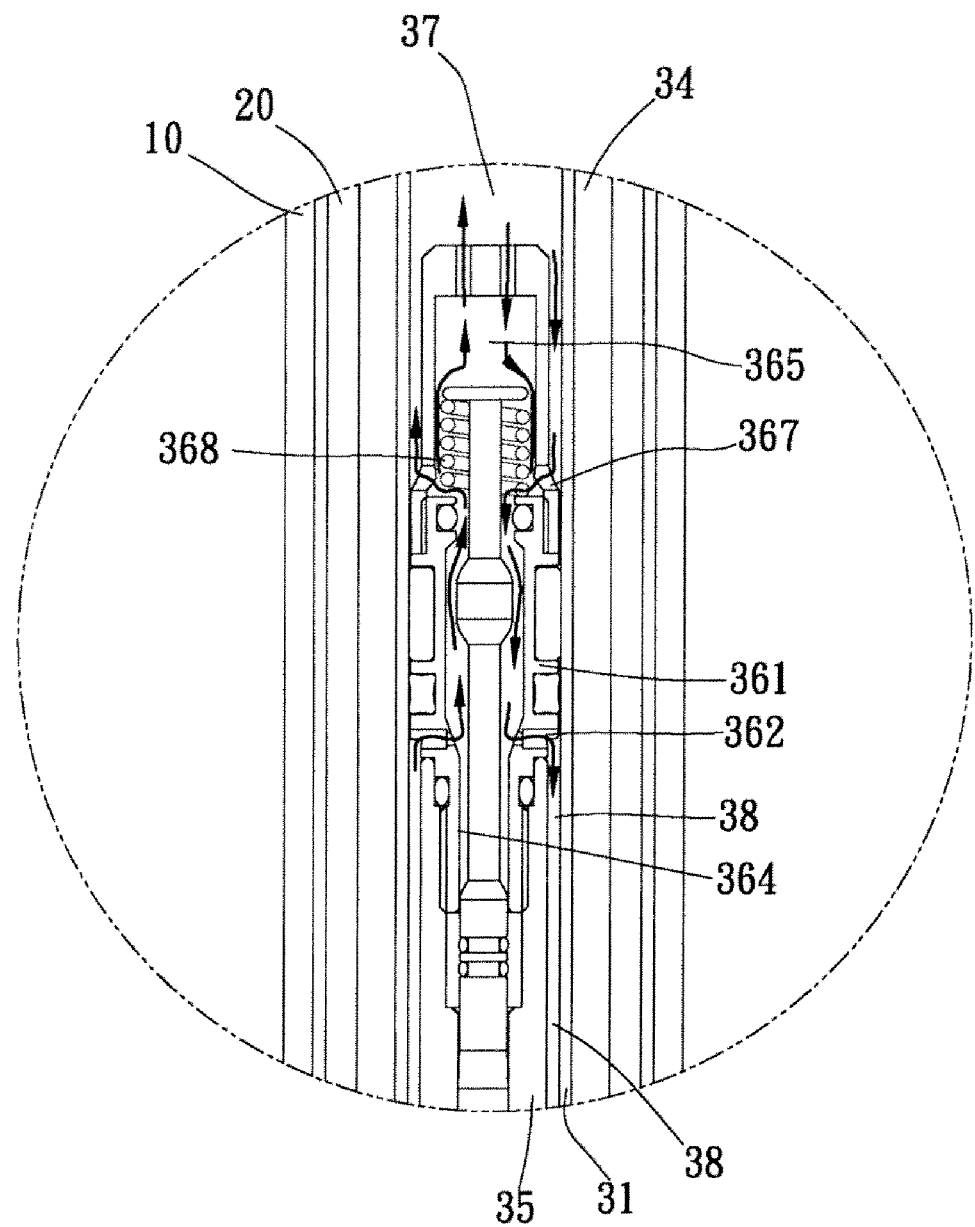
FIG. 15 is a cross sectional view to show the flow of the hydraulic oil of the third embodiment of the bicycle seat adjustable device of the present invention.

FIGS. 13 to 15 show the third embodiment of the present invention, wherein the spring 368 is located in the sleeve 366 and two ends of the spring 368 are in contact between the valve frame 361 and the valve rod 364 so as to provide a return force to the valve rod 364. The stop 365 is located at the mediate portion of the valve rod 364 and close to the outlet of the valve frame 361. By the linear movement of the valve rod 364, the stop 365 is moved to open or close the path in the valve frame 361.

The operation of the embodiment is in reverse when compared with the first embodiment, when adjusting the seat, the control unit 363 moves the valve rod 364 toward the valve frame 361 and the stop 365 is removed from the periphery of the valve frame 361 to enter into the valve frame 361 such that the path 38 is opened and the hydraulic oil flows from the inner oil room 37 to the outer oil room 33, or from the outer oil room 33 back to the inner oil room 37. The inner tube 20 is set relative to the outer tube 10.

When the desired height of the seat is reached, the valve rod 364 is linearly moved away from the valve frame 361 by operation of the control unit 363, or the control unit 363 release the force from the valve rod 364, so that the spring 368 provides a return force to the valve rod 364 until the stop 365 contacts the periphery of the valve frame 361 to seal the path 38. A pressure balance is reached between the inner and outer oil rooms 37, 33, and between the inner and outer air rooms 34, 22. The inner tube 20 is set relative to the outer tube 10.

While we have shown and described the embodiment in accordance with the present invention, it should be clear to those skilled in the art that further embodiments may be made without departing from the scope of the present invention.

What is claimed is:

1. A bicycle seat adjustable device comprising:
an outer tube (10) being a hollow tube and a bottom cap (11) sealing a lower end of the outer tube (10);
an inner tube (20) being a hollow tube and a piston (21) sealing a lower end of the inner tube (20), the piston (21) located in the outer tube and an outer air room (22) defined in the outer tube (10) and located between the piston (21) and the bottom cap (11), a clamp unit (40) connected to a top end of the inner tube (20), and
a valve control device (30) comprising an outer path tube (31) located in the inner tube (20), a lower end of the outer path tube (31) connected to the piston (21) and a top end of the outer path tube (31) extending toward the clamp unit (40), a movable piston (32) movably mounted to the outer path tube (31), an outer oil room (33) and an inner air room (34) defined between the inner tube (20) and the outer path tube (31), the bottom cap (11) connected to an inner path tube (35) which has a top end extending into the outer path tube (31), a valve unit (36) connected to an upper end of the inner path tube (35) so as to form a path (38) and an inner oil room (37) in the outer path tube (31), the path (38) communicating with the outer oil room (33) and the inner oil room (37), the valve unit (36) controlling communication of the path (38).

2. The device as claimed in claim 1, wherein the valve unit (36) includes a valve frame (361) which is connected to the inner path tube (35) and includes a passage (362) which communicates with the inner oil room (37) and the path (38), a control unit (363) is located between the bottom cap (11) and the inner path tube (35), a valve rod (364) has a first end connected with the control unit (363) and a second end of the valve rod (364) extends through the inner path tube (35) and the valve frame (361), the valve rod (364) opens and closes the passage (362) by linear movement of the control unit (363).

3. The device as claimed in claim 2, wherein the valve frame (361) includes a shell-like sleeve (366) connected to a top end thereof and a through hole (367) is defined through the sleeve (366), the valve rod (364) linearly extends into the sleeve (366), a spring (368) is located between the sleeve (366) and the valve rod (364) to provide a force to the valve rod (364).

4. The device as claimed in claim 2, wherein the valve frame (361) includes a shell-like sleeve (366) connected to a top end thereof and a through hole (367) is defined through the sleeve (366), the valve rod (364) linearly extends into the sleeve (366), a spring (368) is located in the sleeve (366) and two ends of the spring (368) contact between the valve frame (361) and the valve rod (364) so as to provide a force to the valve rod (364).

5. The device as claimed in claim 2, wherein the valve rod (364) has a stop (365) which seals the passage (362) by linear movement of the valve rod (364).

6. The device as claimed in claim 1, wherein the outer oil room (33) and the inner oil room (37) are filled with hydraulic oil which flows between the outer oil room (33) and the inner oil room (37) via the path (38) controlled by the valve unit (36).

7. The device as claimed in claim 1, wherein a top cap (12) is connected to a top end of the outer tube (10) and seals a periphery of the outer tube (10), the inner tube (20) extends through the top cap (12).

8. The device as claimed in claim 1, wherein a nozzle unit (50) is connected between the clamp unit (40) and the inner tube (20), the nozzle unit (50) communicates with the inner air room (34).

9. The device as claimed in claim 8, wherein the nozzle unit (50) has a first end connected to the outer path tube (31) so as to seal the inner oil room (37), a second end of the nozzle unit (50) is inserted into the clamp unit (40).

10. The device as claimed in claim 1, wherein the outer path tube (31) has a closed end which is located opposite to the piston (21).

11. The device as claimed in claim 1, wherein the valve control device (30) includes a spring (39) located in the inner air room (34), an end of the spring (39) contacts the movable piston (32) to provide a return force to the movable piston (32) and to keep pressure balance between the inner air room (34) and the outer oil room (33).

* * * * *